(12) United States Patent
Dhanda et al.

(10) Patent No.: US 11,871,098 B2
(45) Date of Patent: Jan. 9, 2024

(54) CAMERA LENS CONTROL DURING MAGNETIC INTERFERENCE

(71) Applicant: Apple Inc., Cupertino, CA (US)

(72) Inventors: Abhishek Dhanda, San Ramon, CA (US); Andrew D. Fernandez, Cupertino, CA (US); Arathi S. Bale, Sunnyvale, CA (US); David C. Beard, Los Gatos, CA (US); Santiago Alban, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/327,014

(22) Filed: May 21, 2021

(65) Prior Publication Data
US 2021/0281726 A1 Sep. 9, 2021

Related U.S. Application Data

(63) Continuation of application No. 16/566,737, filed on Sep. 10, 2019, now Pat. No. 11,019,241.

(60) Provisional application No. 62/729,813, filed on Sep. 11, 2018.

(51) Int. Cl.
*H04N 23/55* (2023.01)
*H04N 23/67* (2023.01)
*H04N 23/68* (2023.01)
*H04N 23/57* (2023.01)

(52) U.S. Cl.
CPC ............ *H04N 23/55* (2023.01); *H04N 23/67* (2023.01); *H04N 23/687* (2023.01); *H04N 23/57* (2023.01)

(58) Field of Classification Search
CPC ............ H04N 5/2254; H04N 5/23212; H04N 5/23287; H04N 5/2257; H04N 17/002; H04N 23/55; H04N 23/67; H04N 23/687; H04N 23/57
See application file for complete search history.

(56) References Cited

U.S. PATENT DOCUMENTS

| 9,500,838 | B2 | 11/2016 | Shimotsu |
| 9,560,247 | B2 | 1/2017 | Topliss et al. |
| 10,303,041 | B2 | 5/2019 | Sharma |
| 11,019,241 | B1 | 5/2021 | Dhanda et al. |
| 2012/0257065 | A1* | 10/2012 | Velarde ................ H04N 13/296 348/E17.002 |
| 2014/0148808 | A1 | 5/2014 | Inkpen et al. |

(Continued)

*Primary Examiner* — Jason A Flohre
(74) *Attorney, Agent, or Firm* — Robert C. Kowert; Kowert, Hood, Munyon, Rankin & Goetzel, P.C.

(57) ABSTRACT

Methods and apparatus are disclosed for selecting a lens control mode for a camera in external magnetic fields or other types of non-magnetic interference. In embodiments, when the camera is activated, a test of a position sensor for the camera lens is performed by moving the camera lens through a range of positions and collecting values from the sensor. In embodiments, the sensor readings are analyzed to determine conditions such as (a) whether the sensor is saturated by an external magnetic field or non-magnetic interference, (b) whether the sensor's readings are within an error margin, and (c) whether a computed position offset for the sensor is valid. Based on the analysis, the camera is placed into a first control mode where movement of the lens is controlled using the position sensor, or a second control mode where lens movement is controlled without the position sensor.

20 Claims, 9 Drawing Sheets

(56) References Cited

U.S. PATENT DOCUMENTS

| | | |
|---|---|---|
| 2014/0187915 A1 | 7/2014 | Yaroshenko et al. |
| 2015/0198783 A1* | 7/2015 | Shimotsu ................. G02B 7/04 |
| | | 359/814 |
| 2015/0350507 A1* | 12/2015 | Topliss ............... H04N 5/23287 |
| | | 348/208.2 |
| 2016/0070270 A1* | 3/2016 | Beard ................ H04N 5/23287 |
| | | 318/647 |
| 2016/0295097 A1 | 10/2016 | Shanmugavadivelu et al. |
| 2016/0363462 A1 | 12/2016 | English et al. |
| 2018/0041689 A1* | 2/2018 | Cui ........................ G03B 43/00 |
| 2018/0152608 A1 | 5/2018 | Lee et al. |
| 2018/0235436 A1 | 8/2018 | Saito |
| 2018/0275369 A1* | 9/2018 | Takahashi .............. G03B 13/36 |
| 2019/0356858 A1 | 11/2019 | Li et al. |
| 2020/0049939 A1 | 2/2020 | Lee et al. |
| 2020/0166024 A1* | 5/2020 | Webber ................ G02B 27/646 |

\* cited by examiner

CAMERA LENS CONTROL DURING MAGNETIC INTERFERENCE

PRIORITY STATEMENT

This application is a continuation of U.S. patent application Ser. No. 16/566,737, filed Sep. 10, 2019, which claims the benefit of priority to U.S. Provisional Application No. 62/729,813, filed Sep. 11, 2018, which are hereby incorporated by reference herein in their entirety.

BACKGROUND

Technical Field

This disclosure relates generally to camera systems, and more specifically to lens positioning control in the presence of external magnetic or non-magnetic interference.

Description of the Related Art

The advent of small, mobile multipurpose devices such as smartphones and tablet or pad devices has resulted in a need for high-resolution, small form factor cameras for integration in the devices. Such cameras may include an autofocus (AF) mechanism to adjust the camera's focal distance to focus an object plane or field in front of the camera at an image plane to be captured by a photosensor. In some such autofocus mechanisms, the optical lens is moved as a single rigid body along the optical axis of the camera to refocus the camera. The autofocus position may be measured using sensors, which may be located on the camera module substrate along an axis of the lens.

In addition, high image quality is easier to achieve in cameras if lens motion along the optical axis is accompanied by minimal parasitic motion in the other degrees of freedom, for example on the X and Y axes orthogonal to the optical axis of the camera. Thus, some cameras may include optical image stabilization (OIS) mechanisms that may sense and react to external excitations or disturbances by adjusting location of the optical lens on the X and/or Y axis in an attempt to compensate for unwanted motion of the lens. In such cameras, knowledge of the position of the lens is used to adjust the positioning of the lens in the XY plane.

SUMMARY OF EMBODIMENTS

Embodiments of the present disclosure may provide improved lens positioning capabilities for cameras by detecting and analyzing external magnetic field interference or some other type of non-magnetic external interference on position sensors on the camera, such as autofocus positions (AP) sensors or optical image stabilization position (OIS) sensors, and then adjusting lens control of the camera accordingly. In some embodiments, the cameras may be small cameras that are readily movable, which may be embedded in mobile devices such as smartphones, cell phones, or tablet devices, and may also be used in other devices such as laptop or notebook computers. The camera may include an autofocus (AF) mechanism in which the position of the optical lens is adjusted along the optical axis (referred to as the Z axis) of the camera to refocus the camera. The autofocus position may be measured using position sensors. In some embodiments, the camera may include an optical image stabilization mechanism in which the optical lens is translated in the XY plane relative to the photosensor of the camera. The lens position may also be measured using OIS position sensors. Occasionally, the camera may be activated in the presence of an external magnetic field or other external interference, which may interfere with the operations of the position sensors in the camera and cause the sensors to generate incorrect sensor values, causing the camera to behave incorrectly.

Accordingly, in some embodiments, a test of the position sensor is performed at the start of the camera session. In some embodiments, the test of the position sensor is performed by moving the camera lens through a range of positions and collecting values from the sensor. The sensor readings may be analyzed to determine a number of conditions such as (a) whether the sensor is saturated by an external magnetic field or other external interference, (b) whether the sensor's readings are within an error margin, and (c) whether a computed position offset for the sensor is valid. In some embodiments, some of the conditions may be determined in parallel, so that the test can be performed very quickly. If the test is successful, the camera may be placed into a first control mode where movement of the lens is controlled using the position sensor and the computed offset. Otherwise, the camera may be placed in a second control mode where lens movement is controlled without the position sensor. In some embodiments, if the test is not successful, a user notification may be generated, indicating that the camera has selected a backup control mode due to the presence of the external interference.

Figure 1:
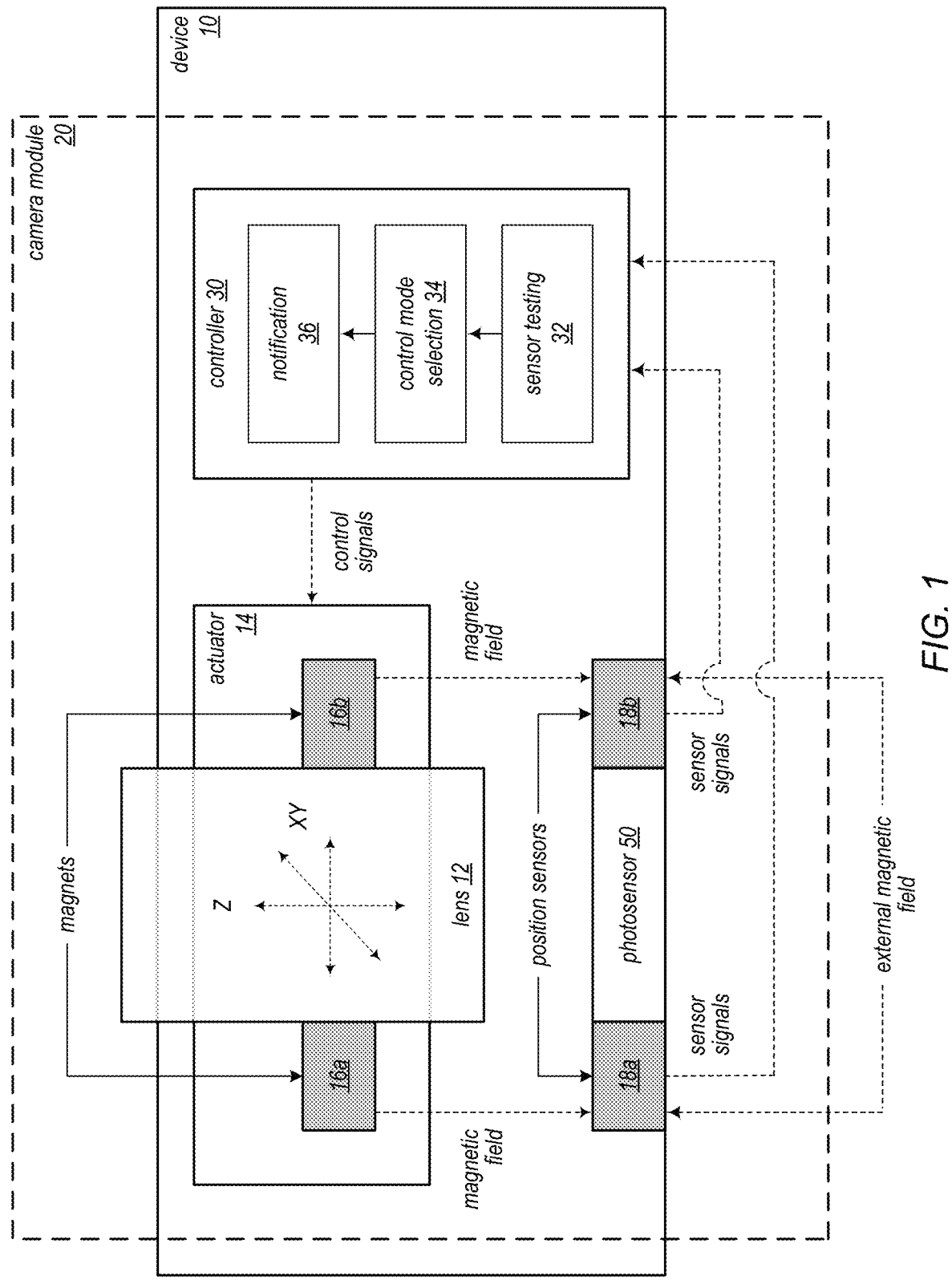
FIG. 1 is a diagram of an example device that includes a camera module with a camera lens movement controller that selects a control mode in different magnetic fields, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ". Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Embodiments of the present disclosure may provide improved lens positioning capabilities for cameras by detecting and evaluating external magnetic field interference or non-magnetic external interference on position sensors on the camera, such as autofocus positions (AP) sensors or optical image stabilization position (OIS) sensors, and then adjusting lens control of the camera accordingly.

In some embodiments, the camera may comprise a small form factor (SFF) camera that are readily mobile, which rely on automated mechanisms to adjust the relative position of the camera lens in response to external conditions, and which are likely to encounter different kinds of external interference (e.g. external magnetic fields) from one camera session to the next. However, while certain embodiments of the camera technologies described herein relate to SFF camera systems used in mobile multipurpose devices such as smartphones and pad devices, other embodiments may be used in any of a variety of other devices, for example, in standalone cameras. Additionally, some embodiments of the camera technologies and methods as described herein may be used for larger cameras and for other lens-based applications.

An example embodiment of a camera system may include, a lens system, a photosensor, and image processing software implemented by one or more processors. In some embodiments, a camera may include an autofocus (AF) mechanism in which the optical lens is moved by an actuator mechanism (e.g. a voice coil actuator (VCA) technology actuator) along the optical axis of the camera system to refocus the camera. Alternatively, in some camera systems, the photosensor may be moved along the Z axis to refocus the camera. The autofocus position may be measured using sensors (referred to herein as autofocus position (AP) sensors), for example Hall effect sensors located on the camera module substrate along an axis of the lens, or alternatively located on the lens. In some embodiments, the camera may include an optical image stabilization mechanism in which the optical lens is translated in the XY plane relative to the photosensor of the camera. The OIS position may also be measured using position sensors. Occasionally, the camera may be activated in the presence of an external magnetic field or other non-magnetic external interference, which may interfere with the operations of the position sensors and cause the sensors to generate incorrect sensor values. These incorrect sensor values may cause the camera to behave incorrectly.

In some embodiments, the camera's position sensors may be configured to detect magnetic fields produced by magnetic components on the body of the optical lens assembly. For example, in some embodiments, the positions sensors may be Hall effect sensors that are designed to generate electrical signals based on their proximity to a magnet attached to the body of the lens assembly. The sensors may be used for a number of functions in the camera, for example, to control the movement of the optical lens, or to calculate the distance to a distant object, among other things.

However, occasionally, the camera may be activated in the presence of an external magnetic field. In some cases, such magnetic fields may be caused by a magnetic accessory, such as a phone case, that is located in the vicinity of the camera. Depending on the strength of the external magnetic field, the interference may significantly alter the sensors values generated by the position sensors in the camera. In some cases, the camera's sensor readings may be affected by other types of external interference, which may be non-magnetic. For example, in some situations, large mechanical forces (e.g. on a rollercoaster) or extreme temperatures may affect the sensors on a camera. Under such conditions, the interference may cause these camera functions to behave incorrectly.

Accordingly, in some embodiments, a test of the position sensor in the camera is performed. The test may be designed to determine how strong the external magnetic field or external interference is, and whether the position sensor can be used in the presence of the magnetic field of external interference. In some embodiments, the test may be performed at the start of a camera session, for example, when a camera app is launched on a smartphone that includes the camera. In some embodiments, the testing may be implemented in firmware associated with the camera module. In some embodiments, the test may be performed very quickly, so that it is completed before the camera begins its normal operations. In some embodiments, if the test is successful, the camera may be placed into a first control mode (e.g., a standard mode) that uses the position sensor during the camera session. For example, the camera may select a control mode for an AF controller or OIS controller that uses the position sensor to make their control decisions. In some embodiments, if the test is not successful, the camera may select second control mode (e.g., a backup mode) that does not use the position sensor during the camera session. In some embodiments, the position sensor may be disabled during the backup mode. In some embodiments, the backup mode may use other means of determining the lens position, for example, using accelerometers attached to the camera that can detect the direction of gravity, etc. In some embodiments, the backup control mode may be less precise than the standard control mode.

In some embodiments, the test of the position sensor may involve the evaluation of a number of test conditions. In some embodiments, during the test, the lens position controller may change the relative position of the camera lens to go through a range of positions, and then collect sensor readings via the sensor being tested. In some embodiments, the test may evaluate whether the position sensor is saturated by the external magnetic field. In some embodiments, the test may determine whether sensor values at certain known positions of the lens are within an error margin. In some embodiments, the test may also attempt to compute a position offset that can be used to compensate for the magnetic field. If the computed offset is invalid (e.g., greater than a threshold), this condition may also indicate a test failure. In some embodiments, the individual test conditions may be evaluated at least partly in parallel, as the camera lens is moved through its range of positions. The test result may be generated based on some or all of these test conditions. In some embodiments, once it is determined that one test condition fails, the entire test may be stopped, so that the remaining test conditions are not evaluated and the testing process can finish faster.

In some embodiments, when the test ends in a failure, a user notification may be generated, indicating that the camera will operate in a backup control mode due to the presence of a magnetic field. In some embodiments, the notification may be provided at the end of the camera session (e.g., when the user closes the camera app), so as to not interrupt the user during the camera session, in order to provide a better user experience. These and other features and benefits of the improved camera lens positioning system are described in further detail below, in connection with the figures.

FIG. 1 is a diagram of an example device that includes a camera module with a camera lens movement controller that selects a control mode in different magnetic fields, according to some embodiments. In some embodiments, the camera module 20 may be an SFF camera module. As shown, the camera module 20 may include a photosensor 50, a camera lens 12, a controller 30 implemented by one or more processors and software, and an actuator 14. The camera lens 12 may include one or more refractive lens elements, which collectively may be referred to as a lens stack, lens barrel, or master lens, and may also include other elements such as an infrared (IR) filter and aperture stop.

The actuator 14 may be configured to mechanically adjust the camera lens 12 with respect to the photosensor 50 on one or more axes under control of the camera application 30. For example, the actuator 14 may provide autofocus (AF) functionality that, under control of the camera application 30, may be used to shift the camera lens 12 up or down on the optical (Z) axis. In some embodiments, the actuator 14 may also provide an OIS functionality to translate the camera lens 12 in the XY plane. In some embodiments, the actuator 14 may include a voice coil actuator (VCA) mechanism. The camera lens 12 may also include two or more magnets 16, for example two magnets 16, which may be diametrically attached to opposite sides of the camera lens 12.

In some embodiments, the magnets 16 may be components of the actuator 14 mechanism. The camera module 20 may also include two or more position sensors 18, for example two Hall effect sensors 18, located on the body of the camera module 20. In some embodiments, the sensors 18 may be located below the magnets 16 on lens 12 on opposite sides of the photosensor 50. In some embodiments, the sensors 18 may be attached to the lens 20, and the magnets 16 may be located on the camera module 20 substrate. In some embodiments, the sensors 18 may be in different locations relative to the magnets 16, positioned so that they can detect movement in different directions.

As shown, the sensors 18 may output signals based on the magnetic field of respective magnets 16. Each sensor 18's signal varies based on distance to a respective magnet 16. For example, in some embodiments, Hall effect sensors may be used. A Hall effect sensor is a transducer that varies its output voltage in response to a magnetic field. The sensor 18 signals are input to the controller 30 and used by the controller 30 to determine current position of the lens 12 with respect to the photosensor 50 and to control the actuator 14 to achieve a desired lens position. For example, in an embodiment where two sensors 18 are used, the voltage output from the two sensors 18 may indicate the current position of the lens 12 with respect to the photosensor 50. The controller 30 may use this positioning information to control the actuator 14 to achieve a desired lens position. In some embodiments, the controller 30 may operate in a closed loop control process with the sensors 18, so that it continuously adjusts the position of the lens 12 via control signals, while at the same time receiving sensor signals from the sensors 18.

As shown, the device 10 or camera module 20 may experience an external magnetic field. As discussed, because the sensors 18 are designed to detect magnetic fields, in some embodiments, an external magnetic field may interfere with the operations of the sensors 18. In some cases, the external magnetic field may cause the sensors to generate incorrect signals. In some cases, the external magnetic fields may cause the sensors to become saturated, so their output are no longer sensitive to the magnetic fields generated by the magnets 16 (or the positioning of the lens 12). In some cases, such magnetic fields may be caused by external components such as a magnetic phone case, a piece of magnetic jewel, or other external magnetic sources.

As shown, in some embodiments, the controller 30 may implement a number of modules to cope with the external magnetic field. Depending on the embodiment, these modules 32, 34, and 36 may be implemented in hardware or software. In some embodiments, the modules are implemented in firmware that is programmed into the camera module 20. In some embodiments, the modules may implement a startup sequence for the camera module, so that a test of the position sensors 18 is performed at the camera module is activated. In some embodiments, individual sensors 18 may be tested individually.

As shown, the controller 30 may implement a sensor testing module 32. The sensor tester 32 may perform a test for the position sensor, to determine if it can still be used in the presence of the external magnetic field. As discussed, in some embodiments, the sensor test may be performed each time that the camera module 20 is activated. In some embodiments, the sensor test may be performed very quickly, before normal operations of the camera module 20 begins. In some embodiments, where the camera module is part of a smartphone or similar device, the camera module may be activated via the launching of a camera app on the smartphone, and the test may be completed before a first preview image is visible in the camera app.

In some embodiments, the sensor tester 32 may cause the lens 12 to move through a range of positions. For example, in some embodiments, the tester may cause the controller to generate control signals (e.g., electrical voltage) to cause the actuator to drive the lens from a top position to a bottom position. During this movement, sensor readings generated by the sensors 18 are captured by the controller 30 and evaluated.

In some embodiments, the sensor test may include evaluation of a number of test conditions. In some embodiments, an evaluation is made whether the sensor is saturated by the external magnetic field. The saturation of a sensor may be indicated if the output values generated by the sensor become insensitive to the lens position or the control input signals. In some embodiments, the lens 12 may only be controllable by the controller 30 within a certain permissible range of positions. However, the sensors 18 may report readings corresponding to positions outside of the control range. When this occurs (e.g., when the sensor is reporting a lens position that is not achievable by the controller 30), this condition may indicate a saturation of the sensor.

In some embodiments, another test condition of the test may including observing whether any sensor values of known positions exceed an error margin for that position. For example, in some embodiments, the control signal provided by the controller 30 may correspond to a known lens position. This association between control input signal and the lens position may be determined previously via a calibration stage, and stored by the controller 30. In some embodiments, multiple such known positions may be stored by the controller 30. During the test, the controller may apply the input signal or voltage to the actuator to move the lens to the known position. The output generated by the sensor 18 at that known position is then captured, and then used to compute the observed position of the lens. In some embodiments, if the known position and the observed position deviate by a sufficiently large amount (e.g., exceeding a specified error margin), this test condition may be deemed to fail. In some embodiments, the sensor test may perform this error margin check for the bottom position of the lens. In some embodiments, the sensor test may check the error margin at the top position of the lens. In some embodiments, the sensor test may check error margins for multiple positions in the lens' movement range.

In some embodiments, another test condition may involve the computation of a position offset from the output values of the sensors 18. In some embodiments, the output sensor values (e.g. voltage readings) are used to perform a calculation to determine the position of the lens. In some embodiments, the resulting position of lens in the external magnetic field may differ from a known position of the lens without the external magnetic field. For example, the known position of the lens may be determined based on a kinematic model of the camera lens, which may be used to determine the position of the lens relative to the camera body as a function of a set of actuator control variables. In some embodiments, determination of the known position of the lens may also take into account the effect of gravity relative to the posture of the camera body. In some embodiments, the difference between the two position (sensed position and known position) may be used to determine a position offset, which may be used to compensate for the effects of the external magnetic field. In some embodiments, this offset may be determined for one or more positions of the lens, and then average to determine an approximate offset value for all positions in the range. In some embodiments, if this computed offset is too large (e.g., above a specified threshold) or invalid (e.g., places the lens at an impermissible location outside the control range), this test condition may be deemed to fail.

In some embodiments, all or some of these test conditions may be employed in the sensor testing by the controller 30. In some embodiments, the test conditions may be evaluated separately or in series. In some embodiments, some of the test conditions may be evaluated at least partly in parallel, so that the sensor testing may be performed faster. For example, as the lens is moved by the actuator through its range of positions, the controller 30 may at the same time evaluate all three test conditions of the sensor test. In some embodiments, all three test conditions must be successful for the sensor to be deemed usable. Thus, in some embodiments, as soon as one test condition fails, the entire sensor test may be stopped. Again, this allows the sensor testing to be completed faster. In some embodiments, the sensor tester 32 generates a test result at the end of the testing process based on the different testing conditions. The test result may be provided to a control mode selection module 34, as shown.

In some embodiments, the control mode selector 34 may take the test result from the sensor tester 32, and select a control mode for the controller 30. In some embodiments, the control mode may persist for the camera session which is being initiated. In some embodiments, the control mode selector 34 may select a first mode (e.g., standard mode) for the controller, which uses the position sensors 18 to control the lens during the camera session. The standard mode may be selected if the sensor testing generated a successful test result for all of the position sensors 18. In some embodiments, the standard mode may use the sensors 18 in a closed loop control process, which repeated obtains sensor readings from the sensors to determine the lens position, and then uses the lens position to make control decisions. In some embodiments, the closed loop control process may also take the effects of gravity into account, which may be measured via one or more accelerometers on the device 10. In some embodiments, the close loop control process may also use the position offset calculated during the sensor testing process to compensate for the effects of the external magnetic field.

In some embodiments, if the test result is not successful, the control mode selector 34 may select a second control mode (e.g., backup mode) for the controller 30. In some embodiments, the backup control mode will not use the sensors' output values, and only rely on other sources of information, such as the device accelerometers. In some embodiments, the position sensors may be disabled. In some embodiments, the backup control mode is an open loop control mode, where the controller does not operate in a feedback loop with respect to the input sensors. In some embodiments, the backup control mode may be less accurate or more difficult to perform than the standard control mode. For example, in some embodiments, the closed loop control mode allows the sensor's position to be "locked" with respect to the device orientation, while the open loop mode does not.

In some embodiments, the control mode selector 34 may also adjust other configuration settings of the camera module based on test result. For example, in some embodiments, readings from the sensors 18 are used on calculations other than calculations to control the lens position. In some embodiments, for example, the sensor output may be used to calculate the distance from the lens to a distant object. In some embodiments, if the test result is unsuccessful, the selector 34 may disable the use of the position sensors 18 for such other calculations.

As shown, the controller 30 may also implement a notification module 36. In some embodiments, the notification module may report the results of the testing or the decision of the control mode selector 34 to a user interface. In some embodiments, the user notification may indicate that the camera module is operating in a backup mode, due to the detection of an external magnetic field. In some embodiments, the notification may be provided only when certain test conditions in the sensor test are failed. In some embodiments, the user notification may be provided to a display of the device, for example, a display on a smartphone that can be used to preview images received by the camera module. In some embodiments, the user notification may indicate a recommendation to the user on how to diagnose or fix the problem, for example, to remove any magnetic accessories from the camera. In some embodiments, the notification may be displayed at the start of the camera session. In some embodiments, the notification may be displayed at the end of the camera session, so as to not interrupt the user during the camera session itself.

Figure 2:
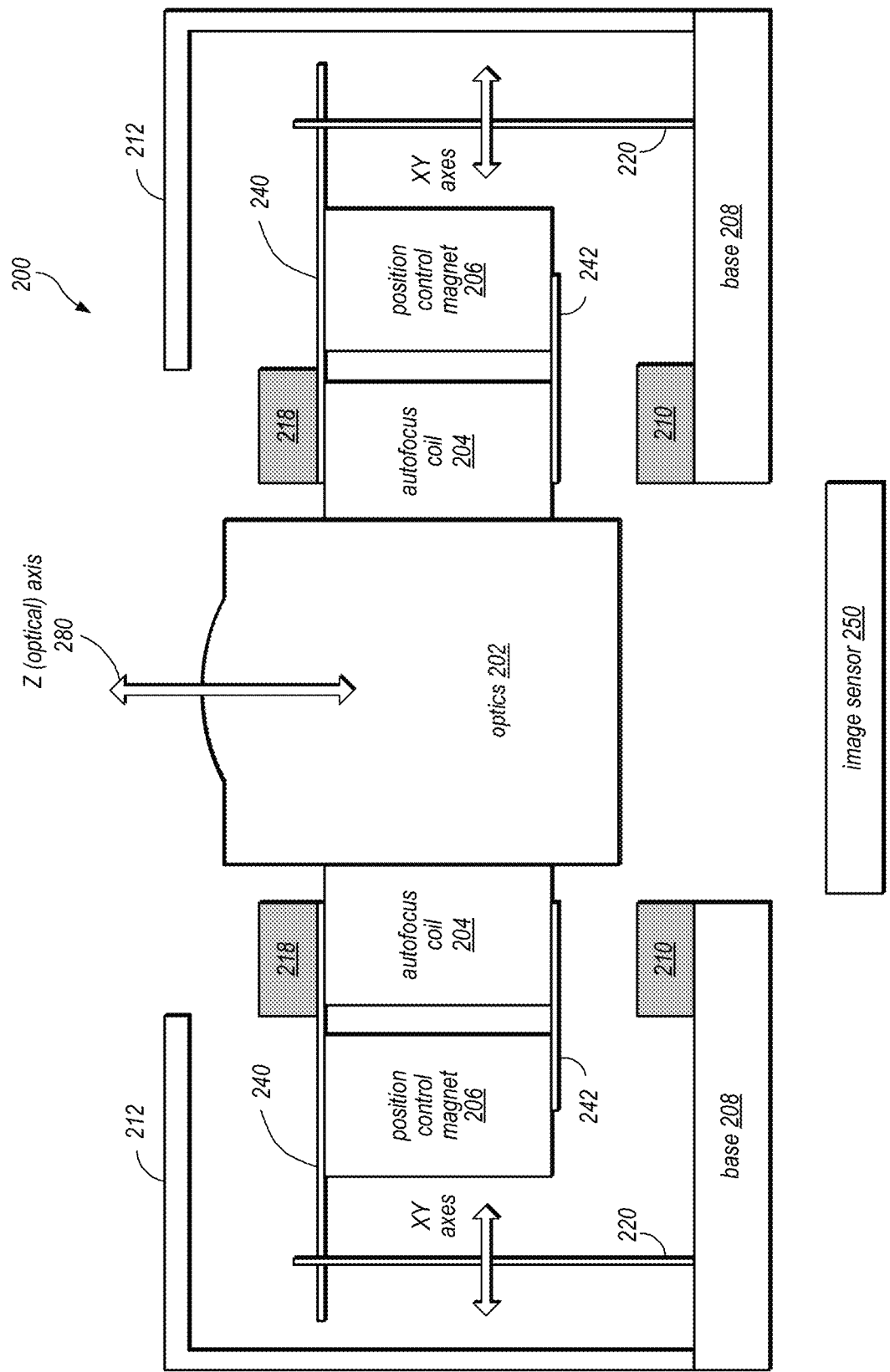
FIG. 2 illustrates an example camera module in which signals from autofocus position (AP) sensors are used to control the movement of the camera lens, according to some embodiments.

FIG. 2 illustrates an example camera module in which signals from autofocus position (AP) sensors are used to control the movement of the camera lens, according to some embodiments. In particular, embodiments of magnetic sensing for autofocus position detection may be applied within an actuator package or assembly 200 interacting with an image sensor 250 to stabilize and increase control performance of an optics assembly 200 suspended on wires 220 within an actuator package. As may be understood by those skilled in the art, methods of operations of optical image stabilization actuators and associated sensors may be similarly implemented.

In some embodiments, each position control magnet 206 is poled so as to generate a magnetic field, the useful component of which for the autofocus function is orthogonal to the optical axis of the camera/lens, and orthogonal to the plane of each magnet 206 proximate to the autofocus coil 204, and where the field for all four magnets 206 are all either directed towards the autofocus coil 204, or away from it, so that the Lorentz forces from all four magnets 204 act in the same direction along the optical axis 280.

As shown, an actuator package 300 may include a base assembly or substrate 208, an optics assembly 202, and a cover 212. The base assembly 208 may include one or more of, but is not limited to, a base 208, supporting one or more position sensors (e.g., Hall effect sensors) 210, and suspension wires 220, which enable magnetic sensing for autofocus position detection by detecting movements of position sensor magnets 218. Thus, as may be understood, the position sensors 18 of FIG. 1 may be the position sensors 210 of FIG. 2, and the magnets 16 of FIG. 1 may be the position sensor magnets 218 of FIG. 2, or any of the other illustrated magnetic components.

In some embodiments, there are four suspension wires 220. An optics assembly 202 may be suspended on the base assembly 208 by suspension of the upper springs 240 of optics assembly 200 on the suspension wires 220. The upper and lower spring(s) may be collectively referred to herein as optics springs. In optics assembly 200, an optics component 202 (e.g., a lens or lens assembly) may be screwed, mounted or otherwise held in or by an optics holder (autofocus coil) 204. In at least some embodiments, the optics 202 or optics holder (autofocus coil) 204 assembly may be suspended from or attached to the position control magnets 206 by upper spring(s) 240, and lower spring(s) 242, and the position control magnets 206 may be rigidly mounted to base 208. The upper spring(s) 240 and lower spring(s) 242 are flexible to allow the optics assembly 200 a range of motion along the Z (optical) axis for optical focusing, and wires 220 are flexible to allow a range of motion on the XY plane orthogonal to the optical axis for optical image stabilization.

In some embodiments, the optics assembly 200 or actuator module may not include position control magnets 206, but may include a yoke or other structure that may be used to help support the optics assembly on suspension wires 220 via upper sprigs 240. While the figure shows the optics assembly 200 to be suspended on wires 220, other mechanisms may be used to suspend an optics assembly 200 in other embodiments. In some embodiments, the optics assembly 200 may include fewer or more components than the example optics assembly 200 shown in the figure.

Figure 3A:
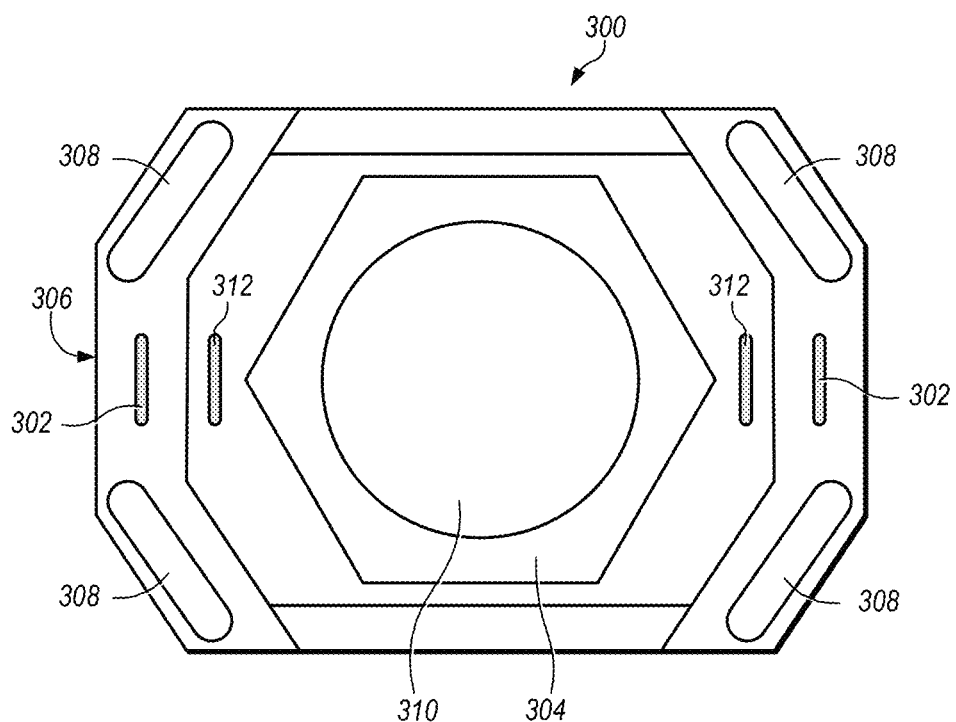
FIGS. 3A and 3B illustrate top views of example actuator modules or assemblies that may be used to provide magnetic sensing for autofocus position detection in cameras, according to at least some embodiments.
Figure 3B:
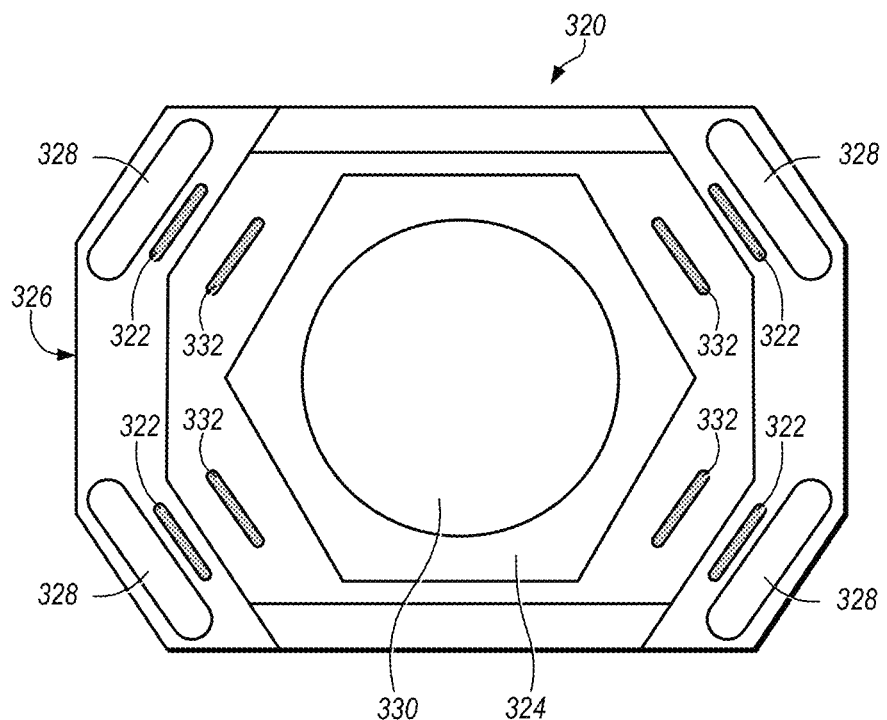

FIGS. 3A and 3B illustrate top views of example actuator modules or assemblies that may be used to provide magnetic sensing for autofocus position detection in cameras, according to at least some embodiments.

In FIG. 3A, an actuator module 300 is presented, which may be used as the actuator 14 of FIG. 1. As shown, the optics assembly or other lens structure 310 is held in an optics holder 304, which also carries position sensor magnets 312. A magnet holder 306 holds position control magnets 308 and Hall sensors 302 or other position sensors, which may be any magnetic sensor or other applicable sensor. Thus, as may be understood, the position sensors magnets 312 may be the magnets 16 of FIG. 1, and the Hall sensors 302 may be the position sensors 18 of FIG. 1.

In some embodiments, multiple (i.e., two or more) sensor or probe magnets 312 and multiple (i.e., two or more) sensors 302 may be employed. In some embodiments, the probe or sensor magnets 312 are arranged in pairs having opposite or reversed polarity. In some such embodiments in which the magnets 312 are reversed in polarity, a sensed position measurement is calculated from the difference of two or more sensor signals from the two or more sensors 302. In some embodiments, the use of two sensors 302 and probe magnets 312 effectively doubles the sensed signal, improving system resolution while concurrently providing immunity to interference from external magnetic fields. Some such embodiments may perform position calculations based on an assumption that an external magnetic field is fairly homogenous, and will introduce a similar offset at both sensors 312 of each pair, with the result is that the impact of the external magnetic field is algorithmically cancelled. Of course, when the external magnetic field is not homogenous or substantial, this assumption will no longer hold. In such situations, as discussed, the actuator controller may be used to detect the condition and switch to a control mode that does not employ the position sensors.

FIG. 3B depicts another embodiment of an actuator module or assembly what may be used to implement the actuator 14 of FIG. 1. As shown, the actuator assembly 320 includes an optics assembly or other lens structure 330 held in an optics holder 324, which also carries position sensor magnets 332. A magnet holder 326 holds position control magnets 328 and Hall sensors 322 or other position sensors, which may be any magnetic sensor or other applicable sensor. Thus, as may be understood, the position sensors magnets 322 may be the magnets 16 of FIG. 1, and the Hall sensors 332 may be the position sensors 18 of FIG. 1.

In this embodiments, four sensor or probe magnets 332 and four position sensors 322 are employed. Here again, the probe or sensor magnets 332 are arranged in pairs having opposite or reversed polarity. In some such embodiments in which the magnets 322 are reversed in polarity, a sensed position measurement is calculated from the difference of two or more sensor signals from the sensors 322. As discussed, the use of multiple sensors 322 and probe magnets 332 effectively improves system resolution while concurrently providing immunity to interference from external magnetic fields. In some embodiments, the position sensor tester 32 may test all of the position sensors 322 individually, so that a determined failure of any one sensor may trigger the control mode to switch to the backup control mode. In some embodiments, the backup control mode may be selected only if a certain number of position sensors fail, or if a certain arrangement of position sensors fail. In some embodiments, all of the position sensors may be tested in parallel (e.g., during a single movement of the lens assembly), so that the sensor testing process can be completed faster.

Figure 4A:
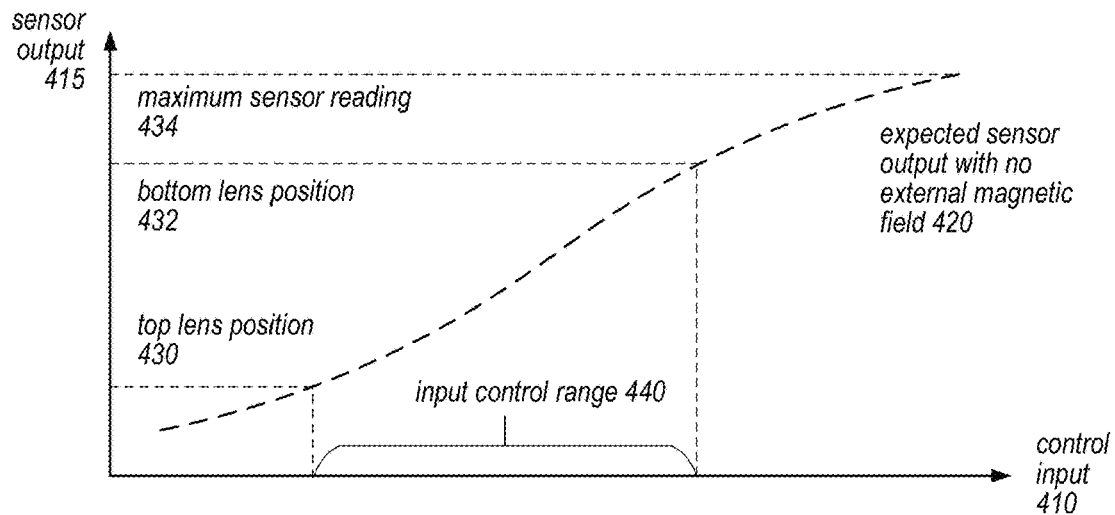
FIGS. 4A to 4C illustrate test conditions that may be evaluated during a test of a camera lens position sensor in a magnetic field, according to some embodiments.
Figure 4B:
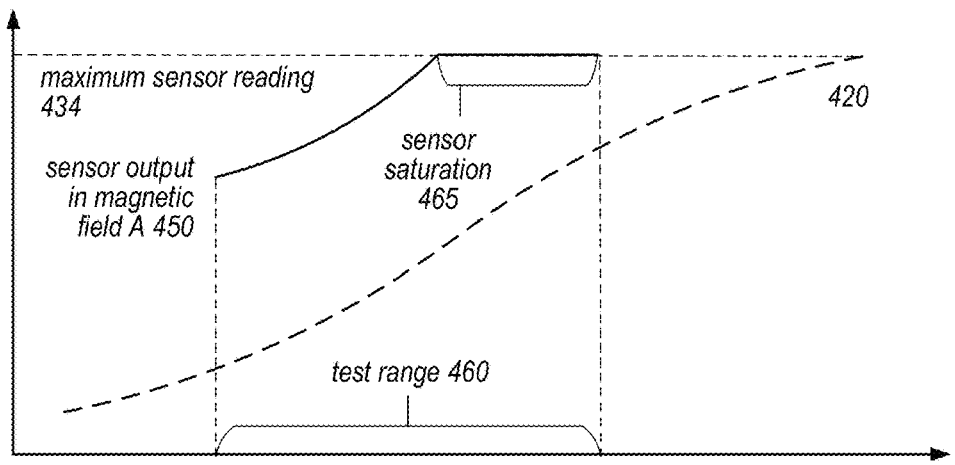
Figure 4C:
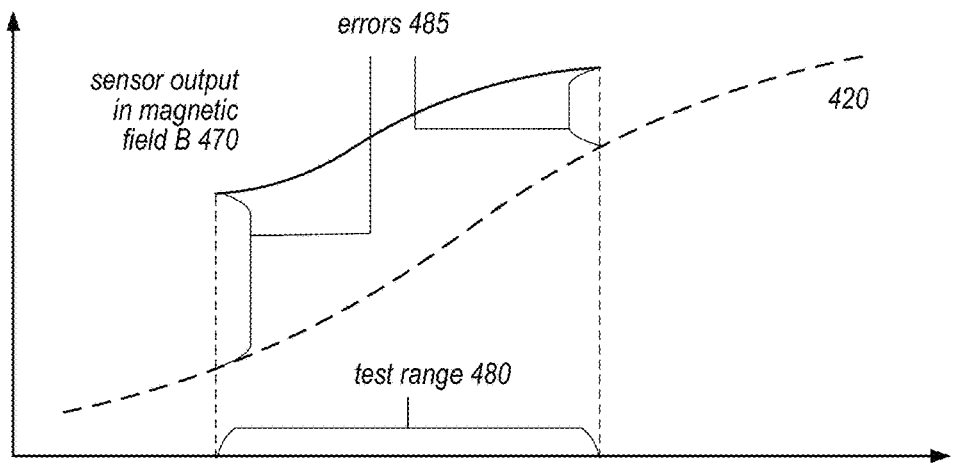

FIG. 4A to 4C illustrate test conditions that may be evaluated during a test of a camera lens position sensor in a magnetic field, according to some embodiments. In each of the three figures, a graph is shown of sensor output values 415 plotted against control input values 410. As discussed, in some embodiments, the sensor test performed by the controller 30 of FIG. 1 may cause the lens assembly to be moved from one position to another position (e.g., from a bottom position to a top position, or in the reverse direction). This movement may be caused by applying control input signal (e.g. a voltage), which drives the lens to move from one position to another. Thus, for example, position sensor test may involve applying increasing control input voltage to the actuator during the test period, which causes the lens assembly to move, which in turn produces a curve of output sensor values as seen in the figures. As may be understood, in different embodiment, the direction of the lens movement during the test may be different, and the relationship between the control input values 410 and the sensor output values 415 may be different.

FIG. 4A depicts the expected sensor output of a position sensor, when there are no external magnetic fields. As shown, in this example, the sensor output increases with increasing control input. In the resulting curve, two points in the sensor output values indicate the top lens position 430 and the bottom lens position 432, respectively. The relationship between the sensor output values and the lens' actual position may be determined during a calibration stage, which may be performed when the camera module was manufactured. As shown, the range of input control signals that correspond to the range between the top and bottom lens positions is shown to be the input control range 440. The input control range 440 corresponds to a range of permissible sensor output values, which corresponds to a range of permissible lens positions. In some embodiments, the input values, output values, and lens positions of certain known points along the curve 420 are stored by the camera module and used to perform subsequent sensor testing.

As shown, FIG. 4A also indicates a maximum sensor reading level 434. In some embodiments, the position sensor may be able to measure sensor positions that are outside of the control range of the controller. In some embodiments, the maximum sensor reading value 434 is also stored by the camera module, and may be used to detect a saturation of the position sensor.

FIG. 4B depicts a saturation of the position sensor by an external magnetic field A. In some embodiments, this may be one type of test condition that will be evaluated by the controller during a testing of the position sensor. In this example, the controller may drive the lens position using an input control range corresponding to the test range 460. As shown, in this example, the observed sensor output 450 in magnetic field A deviates significantly from the expected sensor output values 420. As shown, at some range 465 of input values, the position sensor reports sensor readings at the maximum sensor reading level 434. In some embodiments, this condition indicates that position sensor is saturated by the external magnetic field A. Accordingly, in some embodiment, this condition indicates a saturation of the sensor and causes the position sensor to fail testing. In some embodiments, the saturation condition may be detected in other ways. For example, in some embodiments, the controller may detect that for a range of input control values, the output sensor values do not change or behave in another fashion that is consistent with sensor saturation. These conditions may also cause the position sensor test to fail.

FIG. 4C depicts another situation where the observed sensor output from the position sensor deviates from the expected sensor output 420. In this case, the position sensor is not saturated. However, at certain control input values (e.g., for the top and bottom lens positions), the controller expects the position sensor to return a known output value corresponding to known lens positions. In some embodiments, these points represent mechanical reference points that are associated with known control input and known sensor output, determining at the time of manufacture. In some embodiments, the known values of the reference points may be stored by the controller and used during the position sensor testing. As shown, in this example, there are errors 485 at both the top lens position and the bottom lens position. In some embodiments, these errors may be evaluated to determine if they are excessive. For example, in some embodiments, they may be checked against an allowable error margin. If one of the errors 485 is above the allowable error margin, the position sensor test may be deemed to fail. In some embodiments, only the error at a single lens position (e.g., top or bottom position) may be checked against the margin. In some embodiments, errors at multiple lens positions may be checked. In some embodiments, an averaging of the errors at multiple lens positions may be checked against a margin. In some embodiments, the allowable error margin may be different for different lens positions.

Figure 5:
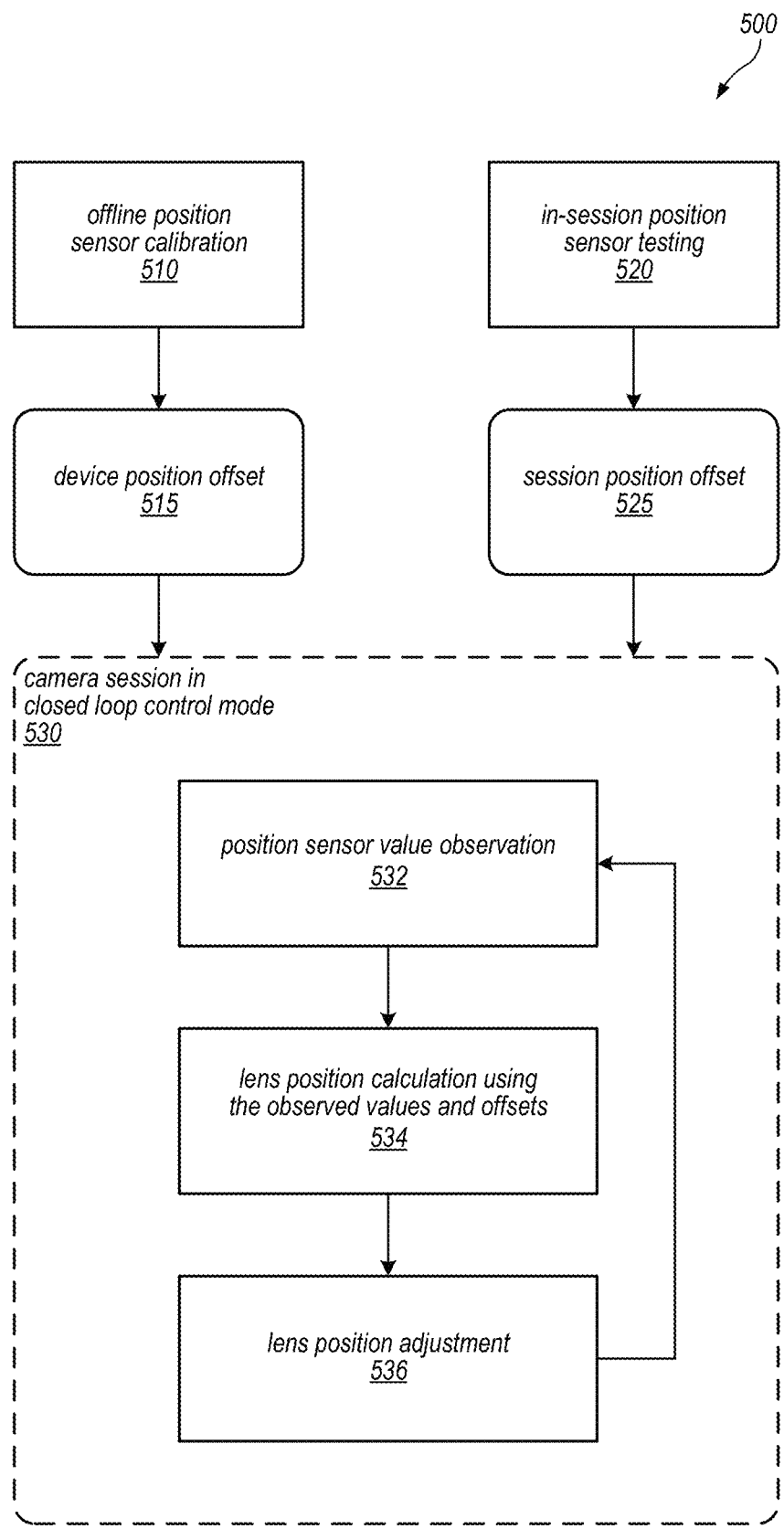
FIG. 5 illustrates example position offsets that may be used by a camera lens controller and the operations of an example closed loop control mode of the camera lens controller, according to some embodiments.

FIG. 5 illustrates example position offsets that may be used by a camera lens controller and the operations of an example closed loop control mode of the camera lens controller, according to some embodiments.

As shown, in some embodiments, the lens movement controller (e.g. controller 30 of FIG. 1) may employ two offsets. In this example, the controller employs a device position offset 515 and a session position offset 525. In some embodiments, the device position offset may be set via an offline or field calibration process. In some embodiments, the offline calibration process may be performed in the factory or by the manufacturer of the camera module. In some embodiments, the offline calibration process may be performed via a calibration process subsequent to the camera module's manufacture. In some embodiments, the device position offset 515 may be performed in an environment where the module is in a stationary position and where there are no substantial magnetic fields. The device position offset 515 may be stored within the camera module to be used by the controller during its operations.

In some embodiments, the session position offset 525 may be determined in an in-session position sensor testing process 520. For example, in some embodiment, the testing may be performed as soon as the camera module is activated, in the beginning of the camera session. In some embodiments, the testing may be performed at another time during the camera session, for example, in response to a user input. For example, the position sensor testing may be trigger via a button push by the camera's user. In some embodiments, the session position offset 525 may not be stored permanently, from one session to the next. Rather, the session offset value may be maintained in more transitory memory, which may be released after the camera session. As discussed, in some embodiments, the session position offset 525 computed during sensor testing may be checked to see if it is valid. If the offset is not valid, the controller may simply switch to a backup control mode, where the position sensors are not used.

As shown, in some embodiments, both of these offset values 515 and 525 may be used in a closed loop control mode of the camera module. As shown, in some embodiments, the close loop control mode may operate in a feedback loop. Within the control loop, the controller may perform a first operation 532 to observe position sensor values. For example, as the user uses the camera to manipulate its autofocus or optical image stabilization features, sensor readings from the sensors may be received by the controller.

At operation 534, the lens position is calculated using the observed sensor values and the two offsets 515 and 525. In some embodiments, the two offset parameters may be used in a calculation function implemented in the controller's firmware or higher-level software, which may be used to repeatedly calculate the position of the camera lens. In some embodiments, the two offsets may be added, subtracted, or otherwise combined to determine the position of the camera lens, based on the positions sensors' output. In some embodiments, the position calculation may also be dependent on other inputs, such as the direction of gravity or measurement movement of the camera.

At operation 536, the lens position is adjusted based on the calculated lens position. In some embodiments, the adjustment may be controlled by increasing or decreasing a control signal generated by the controller to the lens actuator. In some embodiments, the increase or decrease may be computed to move the camera lens to a desired position, depending on the needs of the camera. As shown, the feedback loop then returns back to operation 532, where position sensor values are observed once again. In this manner, the controller is continually monitoring the camera lens' position via the position sensors as it is sending control signals to move the lens. In some embodiments, the closed loop control mode allows for more efficient and accurate control of the camera lens than the backup mode, which does not rely on the position sensors.

Figure 6:
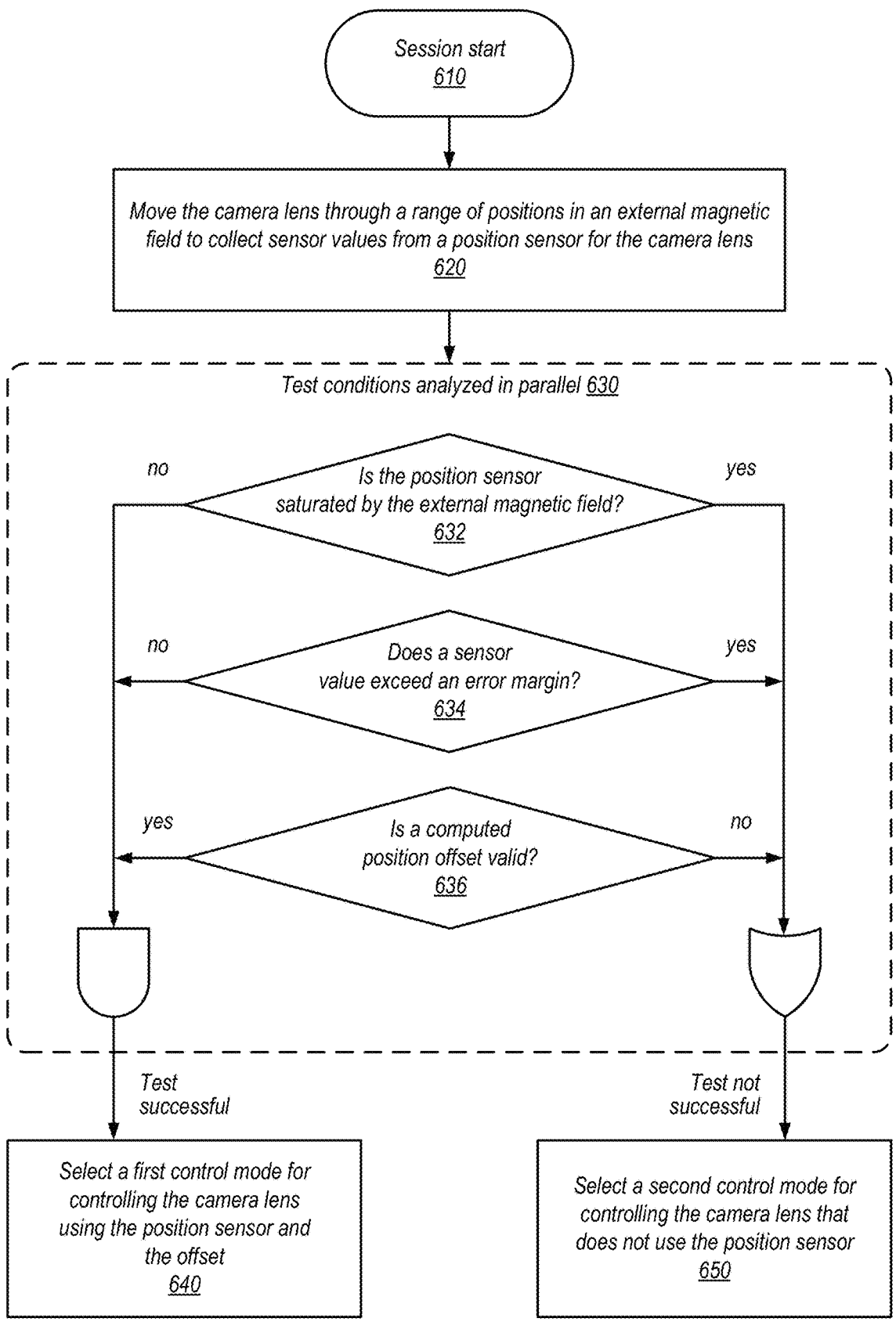
FIG. 6 is a flowchart illustrating a process of testing a camera lens position sensor in a magnetic field, according to some embodiments.

FIG. 6 is a flowchart illustrating a process of testing a camera lens position sensor in a magnetic field, according to some embodiments. The operations depicted in the figure may be performed, for example, by the controller 30, as discussed in connection with FIG. 1.

At operation 610, a session is started. As discussed, in some embodiments, the testing process may be triggered by the start of a camera session, and performed at the very beginning of the camera session. In some embodiments, a camera session may be started via user input. For example, a camera session may be started when a user launches a camera app on a smartphone or similar device, which activates a camera module on the device.

At operation 620, the camera lens is moved through a range of positions, and the sensor values from the position sensor are collected for the camera lens as it moves through the range. In some embodiments, this movement may be performed when an external magnetic field is present. If so, the values generated by the position sensor may be impacted by the magnetic field, and its effects on the sensor are then evaluated. In some embodiments, this movement may be performed to move the camera lens through its full range of possible positions, for example, from a top stop position to a bottom stop position, or in the reverse direction.

At operation 630, test conditions are analyzed on the sensor values generated by the position sensor. In some embodiments, the test conditions may be evaluated at least partly in parallel, so that the testing may be performed faster. As shown, in the depicted example, if all three test conditions 632, 634, and 636 evaluate to successful, the test is deemed to be successful. On the other hand, if any of the three test conditions 632, 634, or 636 evaluates to unsuccessful, the entire test may be deemed unsuccessful. Depending on the embodiments, different criteria may be used for selecting the control mode of the camera lens. In some embodiments, only one or two of the test conditions shown may be used to perform the selection. In some embodiments, other test conditions may be used in the selection criterion. In some embodiments, the test may only be deemed successful only if all position sensors in the camera module test successfully.

At operation 632, a first test condition is evaluated to determine whether the position sensor is saturated by the external magnetic field. In some embodiments, this test condition may be evaluated as the camera lens is moved through its range of positions. In some embodiments, if the position sensor's output stops changing in a control range of input from the controller, this may indicate a saturation of the sensor. In some embodiments, a saturation of the sensor may be indicated when the sensor's outputs reach a maximum sensor reading that is outside the range of lens positions that can be achieved by the controller. In some embodiments, if saturation is detected at any input signal level during the testing, the sensor may be deemed to be saturated.

At operation 634, a second test condition is evaluated to determine whether a sensor value exceeds an error margin. In some embodiments, particular known lens positions associated with particular input signal values may be associated with a known sensor output value. For example, in some embodiments, certain lens positions may correspond to a mechanical reference (e.g., the top or bottom positions of a lens in an AF application), which corresponds to a known sensor output. These known sensor output values may be obtained during a prior calibration process, and may be stored by the controller. In some embodiments, the observed sensor output value during the sensor testing may be compared to the known sensor output values to determine an error. If the observed sensor value's error is greater than a specified error margin, this second test condition fails. In some embodiments, the error condition may be checked for multiple lens positions with known sensor outputs.

At operation 636, a third test condition is evaluated to determine whether a computed position offset is valid. In some embodiments, the position offset may be computed based on a different between a known position of the lens without the magnetic field and a detected position of the lens in the magnetic field. In some embodiments, the known position of the lens may be determined based on a kinematic model of the camera and the lens actuator's control variables. In some embodiments, the known position may also be determined to account for the posture of the camera relative to the direction of gravity. In some embodiments, this position offset may be computed for the camera session to compensate for any detected magnetic fields. In some embodiments, the offset may be used during the camera session to adjust the calculated position of the camera lens based on the position sensor's output. In some embodiments, this computed offset is checked to see if it is a valid offset value, for example, whether it exceeds a maximum threshold, or whether it places the camera lens in an impossible position for some value of control input or sensor output. In the offset value does not satisfy the validity criteria of this part of the test, the third test condition is deemed to fail.

As shown, if the position sensor test is successful, the process proceeds to operation 640, where a first control mode is selected for controlling the camera lens. In some embodiments, the first control mode uses the position sensor and the computed position offset to control the position of the camera lens. In some embodiments, the first control mode may be a standard mode of the camera module. The first control mode may operate in a closed loop process, where the sensor's outputs are continuously used to determine the camera lens' position in a feedback loop. In some embodiments, the first control mode may also employ a gravity compensated calculation that takes into account the direction and effects of gravity, among other inputs.

As shown, if the position sensor test is not successful, the process proceeds to operation 650, where a second control mode for controlling the camera lens is selected. In some embodiments, the second control mode may be a backup mode that does not use the position sensor to control the camera lens. In some embodiments, the second mode may employ a less precise or more computationally difficult method to determine the position of the camera lens. In some embodiments, the second mode may be a closed loop process where the position sensors are not used as feedback to the controller. In some embodiments, the second control mode may also employ a gravity compensated calculation that takes into account direction and effects of gravity, among other inputs.

In some embodiments, the entire process depicted in the figure may be performed as part of an activation sequence of the camera module, before the camera module begins its normal operations. In some embodiments, if the position sensor testing is not successful, or if a particular test condition 632, 634, and 636 is not successful, a user notification may be generated to inform the user of the failure.

Figure 7:
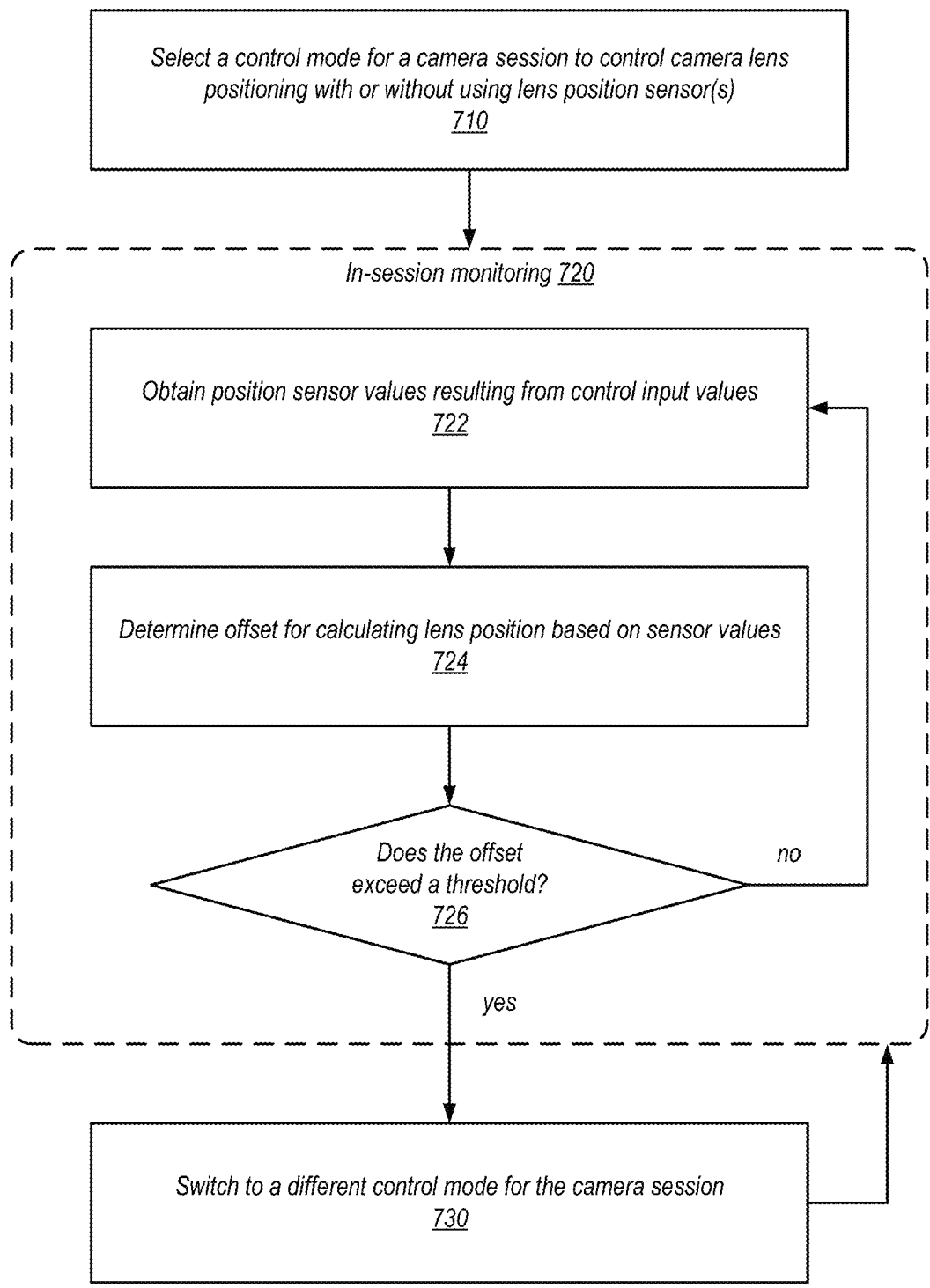
FIG. 7 is a flowchart illustrating a process of monitoring the position offset for a camera lens position sensor during a camera session, according to some embodiments.

FIG. 7 is a flowchart illustrating a process of monitoring the position offset for a camera lens position sensor during a camera session, according to some embodiments. In some embodiments, the process depicted in the figure may be performed by a controller for adjusting the relative position of a camera lens (e.g. controller 30 of FIG. 1).

At operation 710, a control mode is selected for a camera session to control camera lens positioning, either with or without using lens position sensors. In some embodiments, this selection may be performed during the activation of the camera module. In some embodiments, the selection may be performed in similar fashion as discussed in connection with FIG. 6.

Operation 720 depicts a process of in-session monitoring, where the position offset for position sensors are repeated recalculated and evaluated. In some embodiments, this in-session monitoring may only occur under certain circumstances, for example, when the controller detects a possible error condition with the lens position sensors. In some embodiments, the monitoring may occur as a result of a user instruction. In some embodiments, the monitoring may occur periodically or at pseudorandom times.

At operation 722, position sensor values resulting from control input are obtained. In some embodiments, the control inputs are generated as a result of normal operations of the camera module during the camera session. In some embodiments, the position sensor's output values may be sampled to obtain readings at particular lens positions (e.g., when a picture is taken, when autofocus functionality is engaged, etc.).

At operation 724, the position offset for calculating the lens position is determined based on the position sensor values obtained. In some embodiments, the position offset may be determined in similar fashion as discussed in connection with operation 636 of FIG. 6. In some embodiments, the recalculated position offset may not take effect in the controller immediately. In some embodiments, if the recalculated position offset deviates from the offset being used by the controller by a sufficient amount, the controller's current offset may be updated or recalibrated.

At operation 726, a determination is made whether the offset determined in operation 726 exceeds a certain threshold. In some embodiments, a large offset value may indicate that the camera lens position sensors are not behaving as expected. In some embodiments, the threshold may be a configurable value that controls the sensitivity of the monitoring process. In some embodiments, the monitoring process may not take corrective action until the offset exceeds the threshold for several monitoring steps (e.g., three consecutive monitoring steps).

If the determined offset does not exceed the threshold, the process loops back to operation 722, where the in-session monitoring process continues for additional outputs from the position sensors. However, if the determined offset does exceed the threshold, the process proceeds to operation 730, where the camera module or controller switches to a different control mode for the camera session. In some embodiments, the switch may be from a standard mode that uses the position sensors to a backup mode that does not use the position sensors. This may occur if, for example, the camera enters an external magnetic field during the camera session, and the position sensor's accuracy degrades during the session. In some embodiments, the switch may also occur in the opposite direction, from the backup mode to the standard mode. Thus, in some embodiments, the position sensors may still be evaluated in the backup mode even though they are not being used. For example, if the camera module activates in a magnetic field and then subsequently leaves the magnetic field, this may be detected by the controller via the monitoring, and the controller may begin to use the position sensors for the rest of the session.

Figure 8:
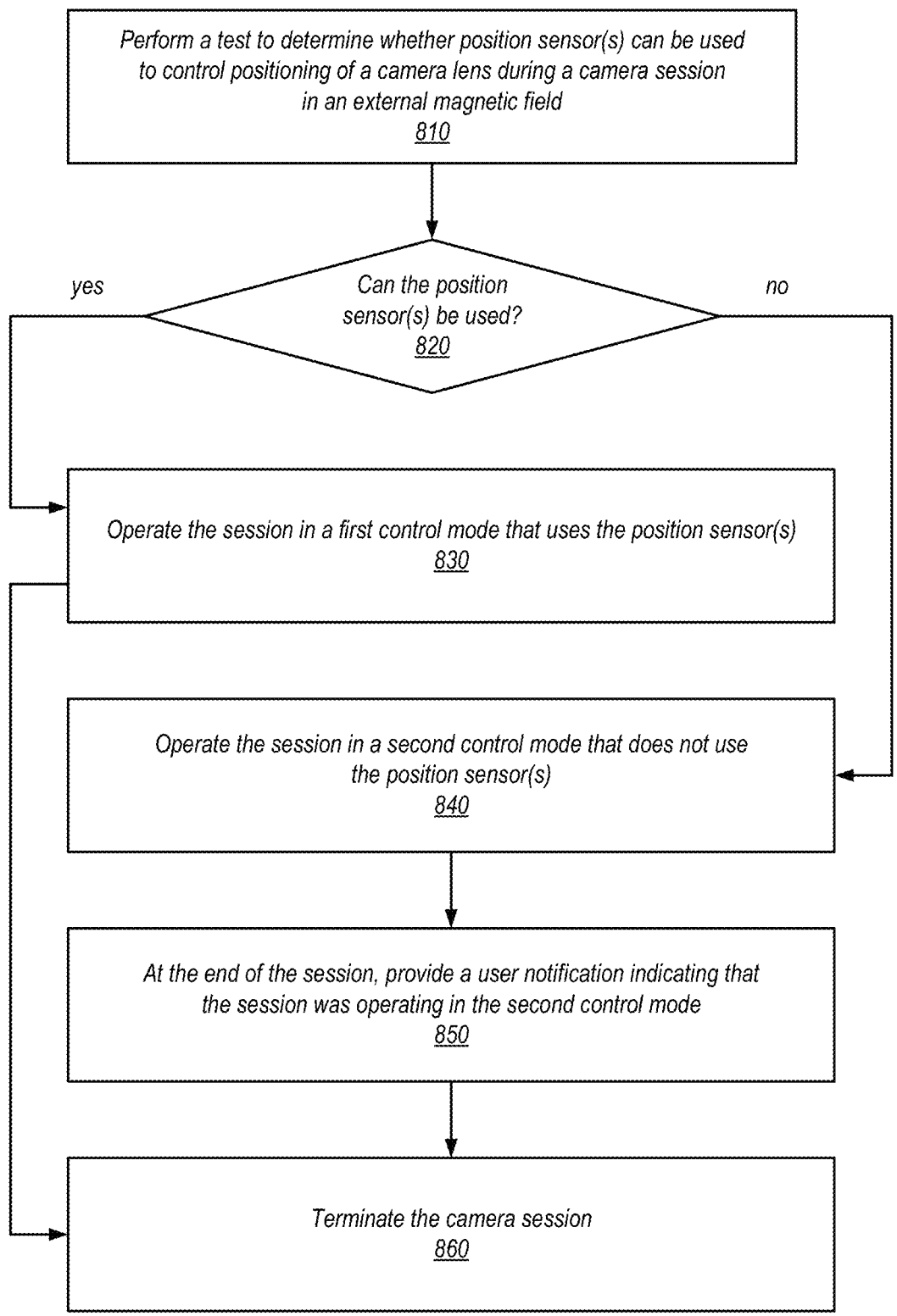
FIG. 8 is a flowchart illustrating a process generating a user notification in response to a test of the camera lens position sensor, according to some embodiments.

FIG. 8 is a flowchart illustrating a process generating a user notification in response to a test of the camera lens position sensor, according to some embodiments. The depicted process of the figure may be performed by, for example, the device 10 of FIG. 1. As discussed, in some embodiments, the device may comprise a smartphone or a similar mobile or communication device that includes a camera module.

At operation 810, a test is performed to determine whether positions sensors can be used to control the positioning of a camera lens during a camera session, in the presence of an external magnetic field. Operation 810 may be performed in similar fashion as the process discussed in connection with FIG. 6. Depending on the embodiment, the test may be performed at different times relative to the camera session. For example, the test may be performed before, at the beginning of, or during the camera session. As shown at operation 820, if the position sensors can be used in the magnetic field, the process proceeds to operation 830. If not, the process proceeds to operation 840.

At operation 830, the camera session is operated in a first control mode that uses the position sensors to control the camera lens' position. The first control mode may operate in a similar fashion as discussed in connection with operation 640 of FIG. 6. At operation 840, the camera session is operated in a second control mode that does not use the position sensors to control the camera lens' position. The second control mode may operate in a similar fashion as discussed in connection with operation 650 of FIG. 6.

At operation 850, if the second control mode is selected, the camera module provides a user notification to the user of the device, indicating that the session was operating in the second mode. In some embodiments, this user notification may be provided at the end of the camera session. Providing the notification at the end of the camera session avoids disturbing the user at the beginning or during the camera session, where the user may be more focused on using the camera. Accordingly, providing the user notification at the end of the camera session provides a better user experience. In some embodiments, the user notification may comprise an alert message generated on a display of the device. In some embodiments, the display may be a display on a smartphone that is also used as a viewfinder for the camera. In some embodiments, the notification may indicate reasons for falling back to the second control mode, and a recommendation on how to resolve the problem (e.g., removing magnetic accessories close to the camera). In some embodiments, the user notification may allow the user to acknowledge the notification but suppress future notifications of this sort. The process then concludes at operation 860, where the camera session is terminated.

Figure 9:
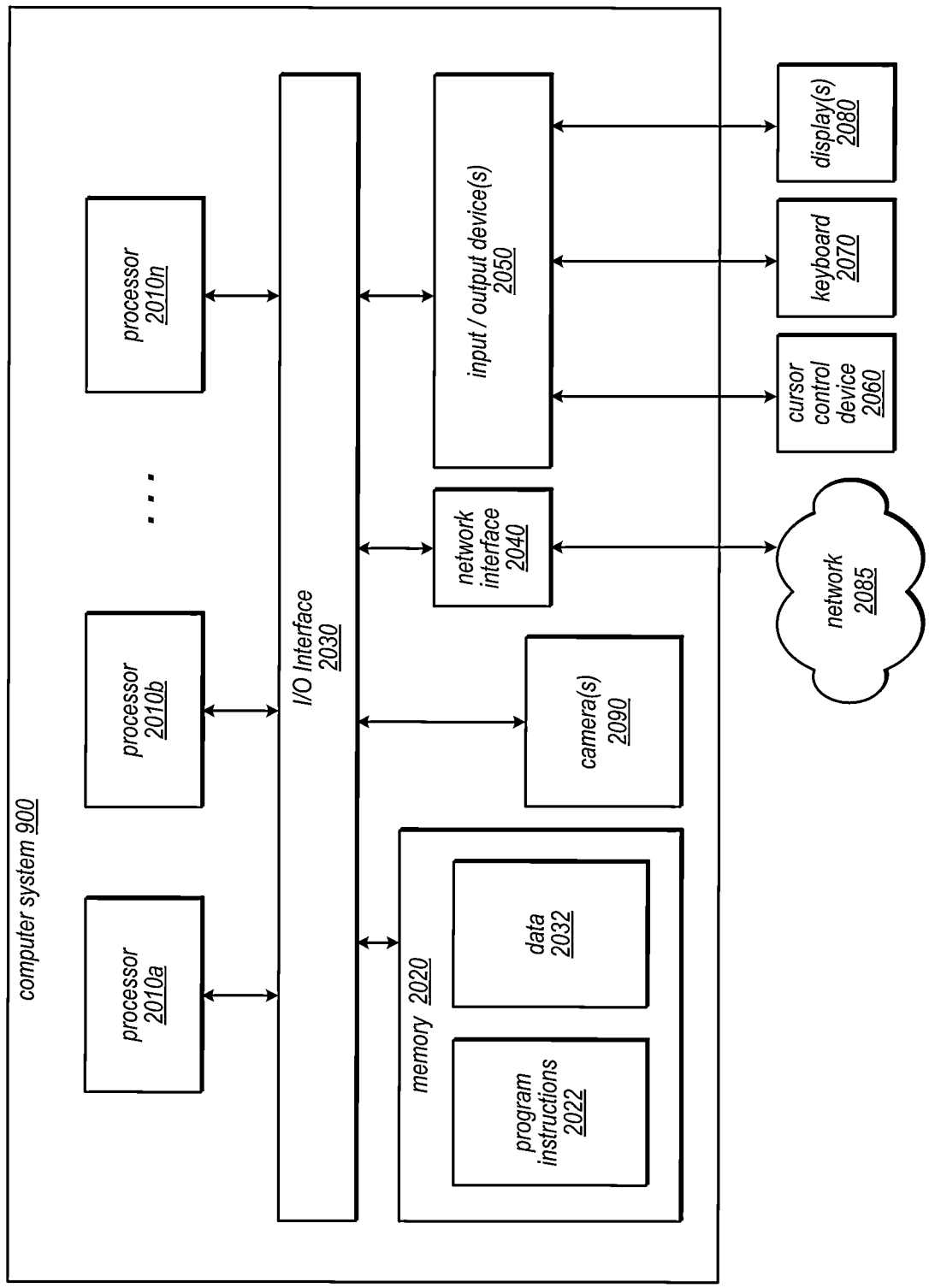
FIG. 9 illustrates an example computer system that may be used to implement one or more components of a camera lens movement controller that selects a control mode in different magnetic fields, according to some embodiments.

FIG. 9 illustrates an example computer system that may be used to implement one or more components of a camera lens movement controller that selects a control mode in different magnetic fields, as illustrated in FIGS. 1 through 8. In addition, computer system 900 may implement methods for controlling operations of the camera, for analyzing image data captured with the camera, and/or for performing image processing of images captured with the camera. In different embodiments, computer system 900 may be any of various types of devices, including, but not limited to, a personal computer system, desktop computer, laptop, notebook, tablet or pad device, slate, or netbook computer, handheld computer, workstation, network computer, a camera, a set top box, a mobile device, a wireless phone, a smartphone, a consumer device, video game console, handheld video game device, a video recording device, or in general any type of computing or electronic device.

In the illustrated embodiment, computer system 900 includes one or more processors 910 coupled to a system memory 920 via an input/output (I/O) interface 930. Computer system 900 further includes a network interface 940 coupled to I/O interface 930, and one or more input/output devices 950, such as cursor control device 960, keyboard 970, and display(s) 980. Computer system 900 may also include one or more cameras 990, for example one or more SFF cameras as described above with respect to FIGS. 1 through 8, which may also be coupled to I/O interface 930.

In various embodiments, computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store program instructions 922 and/or data 932 accessible by processor 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions 922 may be configured to implement various interfaces, methods and/or data for controlling operations of camera 990 and for capturing and processing images with integrated camera 990 or other methods or data, for example interfaces and methods for capturing, displaying, processing, and storing images captured with camera 990. In some embodiments, program instructions and/or data may be received, sent or stored upon different types of computer-accessible media or on similar media separate from system memory 920 or computer system 900.

In one embodiment, I/O interface 930 may be configured to coordinate I/O traffic between processor 910, system memory 920, and any peripheral devices in the device, including network interface 940 or other peripheral interfaces, such as input/output devices 950. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network 985 (e.g., carrier or agent devices) or between nodes of computer system 900. Network 985 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 950 may, in some embodiments, include one or more display terminals, keyboards, keypads, touchpads, scanning devices, voice or optical recognition devices, or any other devices suitable for entering or accessing data by computer system 900. Multiple input/output devices 950 may be present in computer system 900 or may be distributed on various nodes of computer system 900. In some embodiments, similar input/output devices may be separate from computer system 900 and may interact with one or more nodes of computer system 900 through a wired or wireless connection, such as over network interface 940.

As shown, memory 920 may include program instructions 922, which may be processor-executable to implement any element or action to support integrated camera 990, including but not limited to image processing software, and interface software for controlling camera 990. In some embodiments, images captured by camera 990 may be stored to memory 920. In addition, metadata for images captured by camera 990 may be stored to memory 920.

Those skilled in the art will appreciate that computer system 900 is merely illustrative and is not intended to limit the scope of embodiments. In particular, the computer system and devices may include any combination of hardware or software that can perform the indicated functions, including computers, network devices, Internet appliances, PDAs, wireless phones, pagers, video or still cameras, etc. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system 900 via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, solid-state or flash memory media such as USB flash drives, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A computer-implemented method, comprising:
performing, by one or more processors of a camera device:
prior to a camera session, determining a position offset based at least in part on a difference between a known current position of a camera lens relative to a photosensor and a sensed current position of the camera lens relative to the photosensor determined from position sensor data; and
responsive to determining the position offset is valid, using the determined position offset during a camera session, comprising:
controlling the position of the camera lens relative to the photosensor in a first control mode that calculates the position using a lens position sensor, the controlling comprising repeatedly adjusting the position in a control loop based at least in part on the position sensor data and the determined position offset.

2. The method of claim 1, further comprising determining that the position offset is valid repeatedly during the camera session.

3. The method of claim 1, wherein validity of the position offset is based at least in part on an external magnetic field.

4. The method of claim 3, wherein adjusting the position of the camera lens comprises performing an autofocus (AF) of the camera device.

5. The method of claim 3, wherein adjusting the position of the camera lens comprises performing an optical image stabilization (OIS) function of the camera device.

6. The method of claim 1, wherein determining whether the position offset is valid comprises determining whether the position offset is above a threshold or places the camera lens at an impermissible location.

7. The method of claim 1, wherein the known position of the camera lens is determined based at least in part on a kinematic model of the camera device and a posture of the camera device relative to a direction of gravity.

8. The method of claim 1, further comprising:
performing, by the one or more processors of a camera device and during the camera session:
switching to a second control mode in response to a determination that the position offset is not valid, wherein the second control mode does not use the position sensor to determine the position of the camera lens.

9. The method of claim 8, further comprising:
performing, by the one or more processors of a camera device:
providing a user notification that the camera session is operating in the second control mode.

10. The method of claim 1, further comprising:
performing, by the one or more processors of a camera device:
performing a test of the position sensor to determine the position offset, wherein the test moves the camera lens through a range of positions to collect sensor values from the position sensor.

11. The method of claim 10, wherein performing the test comprises testing the position sensor against a plurality of test conditions in parallel.

12. A system comprising:
a camera device configured to:
prior to a camera session, determining a position offset based at least in part on a difference between a known current position of a camera lens relative to a photosensor and a sensed current position of the camera lens relative to the photosensor determined from position sensor data; and
responsive to a determination that the position offset is valid, use the determined position offset during a camera session to:
control the position of the camera lens relative to the photosensor in a first control mode that calculates the position using a lens position sensor, wherein the control comprises repeated adjustments of the position in a control loop based at least in part on the position sensor data and the determined position offset.

13. The system of claim 12, wherein the camera device is configured to determine that the position offset is valid repeatedly during the camera session.

14. The system of claim 12, wherein validity of the position offset is based at least in part on an external magnetic field.

15. The system of claim 14, wherein the camera device is configured to adjust the position of the camera lens as part of an autofocus (AF) of the camera device.

16. The system of claim 14, wherein the camera device is configured to adjust the position of the camera lens as part of an optical image stabilization (OIS) function of the camera device.

17. The system of claim 12, wherein to determine whether the position offset is valid, the camera device is configured to determine whether the position offset is above a threshold or places the camera lens at an impermissible location.

18. The system of claim 12, wherein the camera device is configured to perform a test of the position sensor to determine an initial value of the position offset, wherein the test moves the camera lens through a range of positions to collect sensor values from the position sensor.

19. The system of claim 18, wherein to perform the test, the camera device is configured to test the position sensor against a plurality of test conditions in parallel.

20. A non-transitory computer-accessible storage medium storing program instructions that when executed on one or more processors of a camera device cause the camera device to:
prior to a camera session, determining a position offset based at least in part on a difference between a known current position of a camera lens relative to a photosensor and a sensed current position of the camera lens relative to the photosensor determined from position sensor data; and
responsive to a determination that the position offset is valid, use the determined position offset during a camera session to:
control the position of the camera lens relative to the photosensor in a first control mode that calculates the position using a lens position sensor, wherein the control comprises repeated adjustments of the position in a control loop based at least in part on the position sensor data and the determined position offset.

* * * * *